July 30, 1940.　　J. C. DRADER ET AL　　2,209,562
WORM ELEMENT LAPPING MACHINE
Filed April 15, 1936　　4 Sheets-Sheet 1
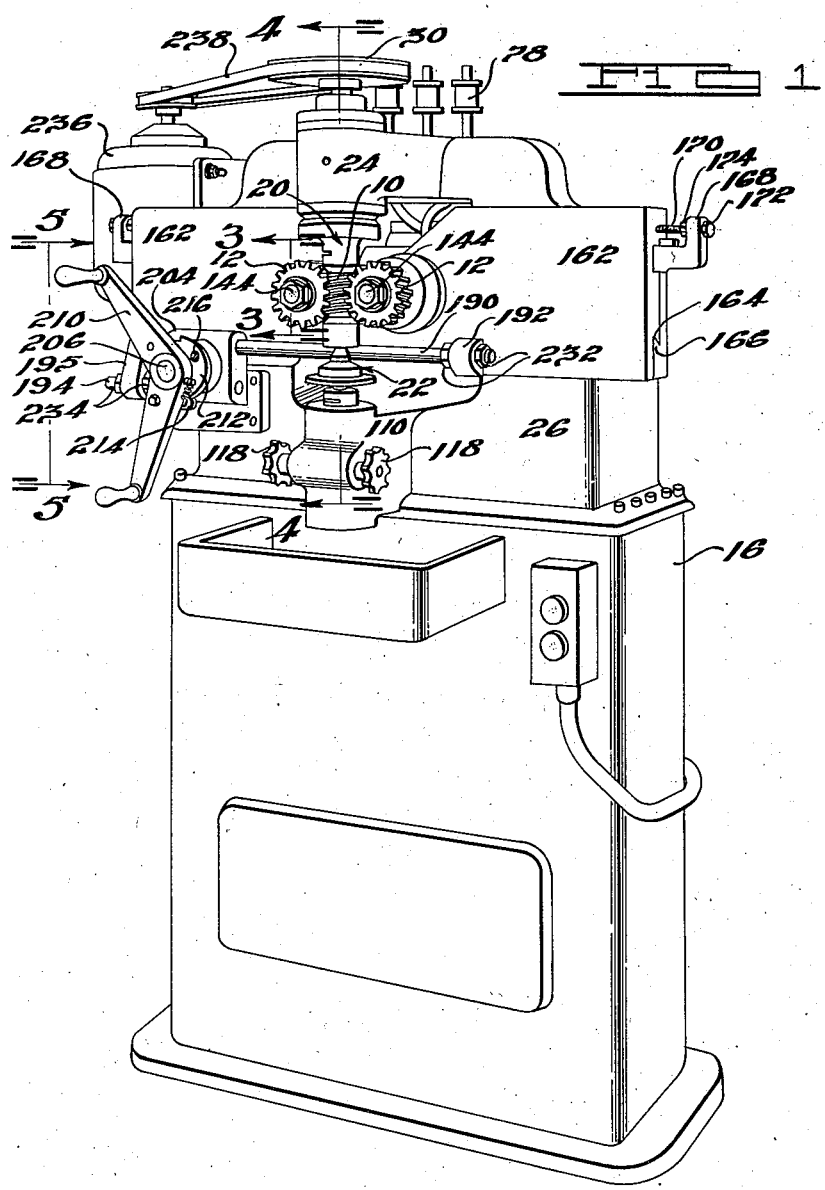
INVENTORS.
Joseph C. Drader,
James Martin.
BY
Harness, Dickey, Pierce & Hann.
ATTORNEYS.

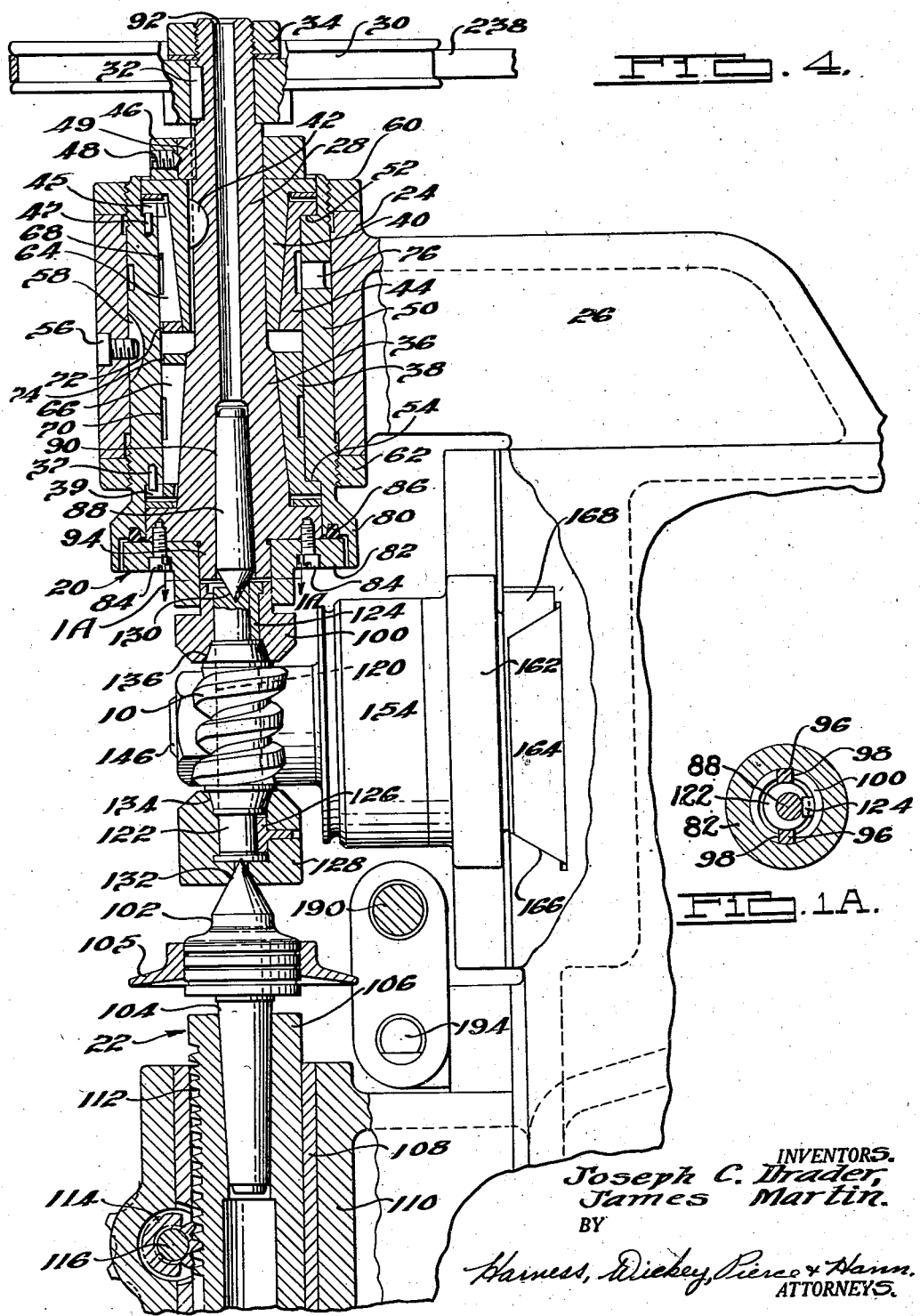

July 30, 1940.  J. C. DRADER ET AL  2,209,562
WORM ELEMENT LAPPING MACHINE
Filed April 15, 1936  4 Sheets-Sheet 3
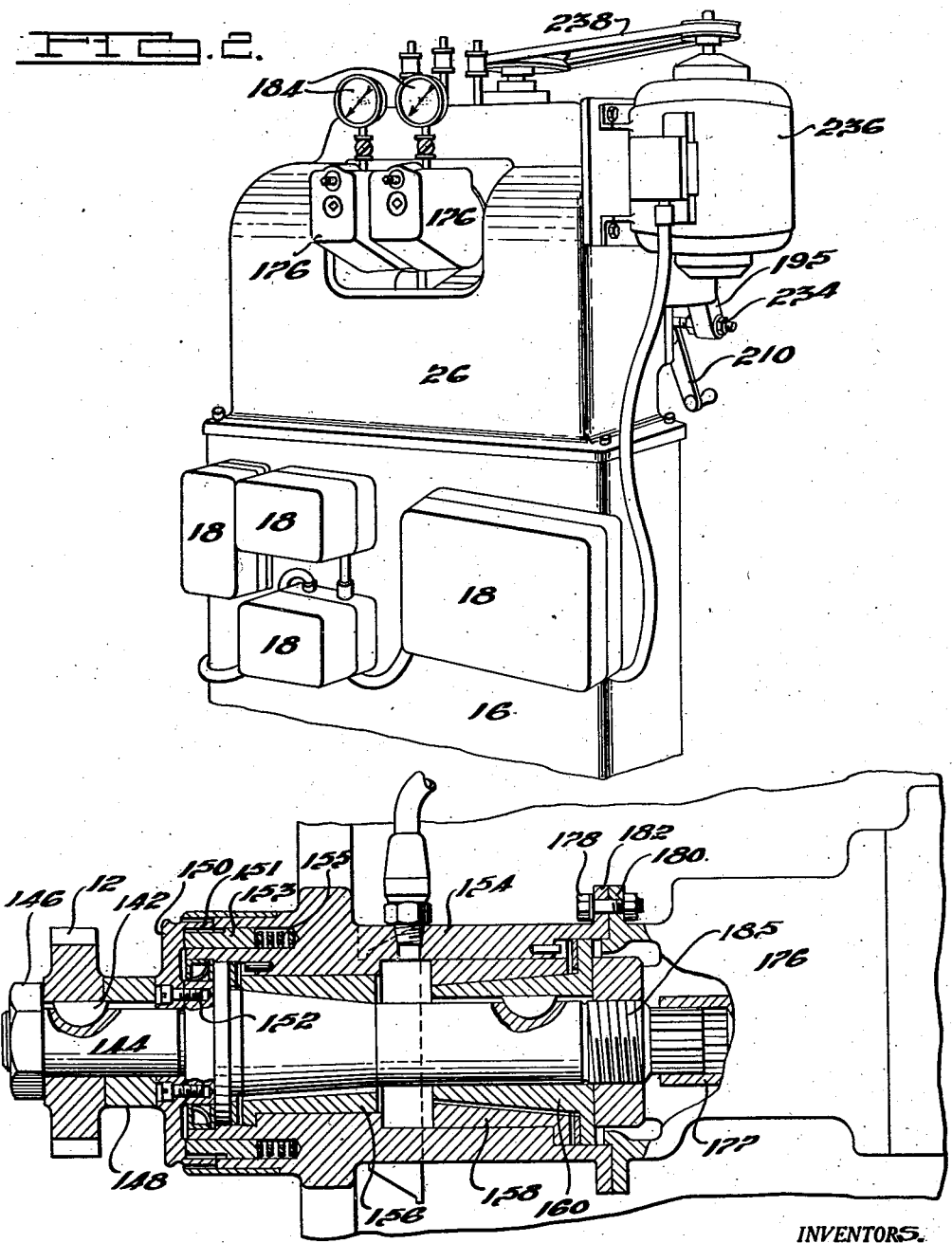
INVENTORS.
Joseph C. Drader,
James Martin.
BY
Harness, Dickey, Pierce & Hann
ATTORNEYS.

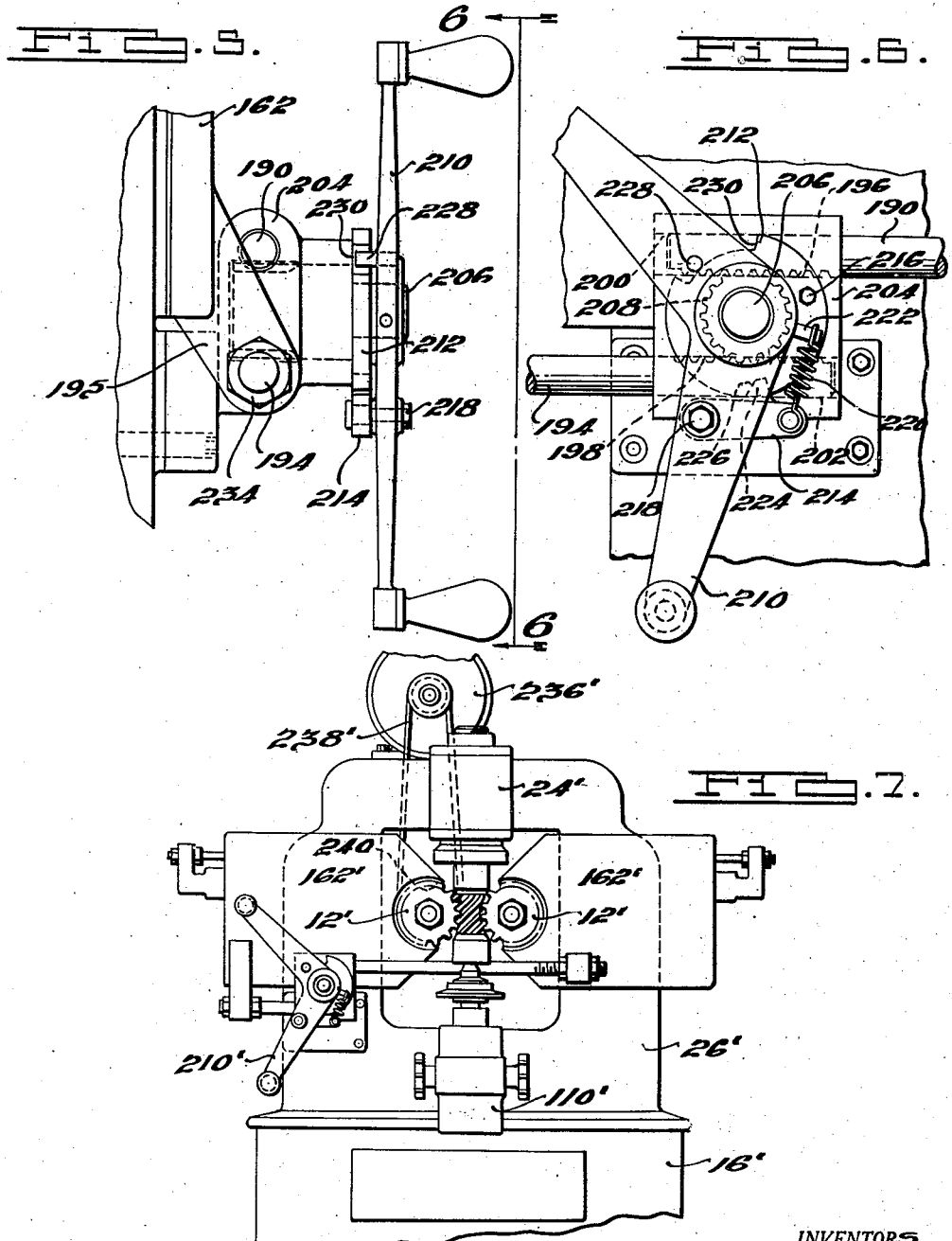

Patented July 30, 1940

2,209,562

UNITED STATES PATENT OFFICE 2,209,562

WORM ELEMENT LAPPING MACHINE

Joseph C. Drader, Detroit, and James Martin, Ferndale, Mich., assignors to Michigan Tool Company, a corporation of Delaware Application April 15, 1936, Serial No. 74,450

3 Claims. (Cl. 51—26)

The present invention relates to gear finishing machines and, in particular, provides an improved machine for lapping or otherwise finishing worm gears of the type in which the pitch circle of the teeth is eccentrically positioned with reference to the axis of the gear.

Objects of the present invention are to provide an improved gear finishing machine adapted particularly to the lapping or otherwise finishing of worm gears; to provide such a machine in which a worm gear and a cooperating lapping tool may be run together to effectively lap the worm gear; to provide such a machine, in accordance with one embodiment of which, the worm gear is driven and all or certain of the finishing tools are driven thereby and are suitably braked to impose a load thereon; to provide such a machine, in accordance with a second embodiment of which, one tool is provided to drive the worm gear, and one or more additional tools may be related to the worm gear in driven relation thereto and suitably braked to impose a load thereon.

Further objects of the present invention are to provide an improved machine for lapping or for otherwise finishing worm gears embodying one or more movable supports for positioning a tool in adjustable relation to the worm gear; to provide such a machine in which one or more tools are rotatably mounted upon slides which are movable toward and away from the axis of the worm gear; to provide improved means for simultaneously controlling the inward and outward movement of a plurality of tool carrying slides; to provide improved releasable means for retaining the tools in working position with reference to the worm gear.

Further objects of the present invention are to provide such a machine embodying improved and readily adjustable means for accurately positioning and rotatably supporting a worm gear in working relation to one or more tools.

Further objects of the present invention are to provide a machine for lapping or otherwise finishing worm gears of the globoidal type and embodying improved adjustable means for accurately positioning the axis of rotation of one or more tools with reference to the axis of the worm gear.

Further objects of the present invention are to provide a machine for lapping or otherwise finishing gears of the type in which the pitch circle of the teeth is eccentrically disposed with reference to the axis of rotation of the worm or other gear being operated upon; and to provide such a machine embodying improved means to support the worm or other gear for rotation about the axis of the pitch circle.

With the above and other objects in view, which appear in the following description and in the appended claims, preferred embodiments of the present invention are shown in the accompanying drawings, throughout which corresponding reference characters are used to designate corresponding parts, and in which:

Figure 1 is a perspective view in front elevation of one embodiment of the present invention;

Figure 1A is a view in horizontal section taken along the line 1A—1A of Fig. 4;

Fig. 2 is a perspective view in a rear elevation of Fig. 1;

Fig. 3 is a view in vertical central section taken along the lines 3—3 of Fig. 1;

Fig. 4 is a detail view, partly in vertical central section, taken along the line 4—4 of Fig. 1;

Fig. 5 is a fragmentary view in elevation, taken along the line 5—5 of Fig. 1;

Fig. 6 is a fragmentary view in detail with certain parts broken away, taken along the line 6—6 of Fig. 5; and Fig. 7 is a partial view in front elevation of a modified embodiment of the present invention.

Considering first the general views, Figures 1 and 2, the worm 10 to be lapped or otherwise finished is supported for rotation about a vertical axis, and the cooperating tools, illustrated as lapping tools 12, and two which are shown in the drawings, are disposed on respectively opposite sides of the worm 10 and are supported with their axes horizontal. The worm 10 and tools 12, as well as the mechanism for adjusting the positions thereof, and for running them together, are supported as a whole in generally elevated relation upon a machine base 16, the necessary operating parts thereof being accessible from the front of the machine, and certain of the control and power elements, such as switches, etc., being supported in cabinets such as 18 at the rear of the machine. It will be appreciated that the teeth of tools 12 are such that they suitably mate with the teeth of the worm element 10, the exact form thereof being dependent upon the specific finishing operation contemplated.

Referring particularly to Figure 4, worm 10, which is of the globoidal or Hindley type, is mounted, with its axis vertical, between an upper or driving spindle designated generally as 20, and a lower spindle designated generally as 22. The upper or driving spindle 20 is rotatably mounted in a boss 24 either suitably secured to or integrally formed with the upwardly extending frame portion 26, and disposed in forwardly extending relation thereto. The driving spindle 20 comprises generally an inner or driving core 28, to the upper end of which a suitable external driving element represented as the pulley 30 is keyed by key 32, and secured in place axially of core 28 by nut 34. The lower portion 36 of core 28 is tapered, and cooperates with a correspondingly and oppositely tapered bearing member 38 to form therewith a bearing adapted to take both radial and axial thrust. A similarly tapered bearing sleeve 40 is keyed by key 42 to core 28 and cooperates with a second tapered bearing member 44 to form a radial and thrust bearing. Sleeve 40 is secured in place axially of core 28 by a collar 46, keyed thereto by key 49, and set screw 48, which jams key 49 against core 28. The two bearing members 38 and 44 are fitted into an adjusting sleeve 50, provided with annular shoulders 52 and 54, which cooperate with correspondingly formed annular shoulders in the bearing members to determine the positions of the latter within the sleeve 50. Members 38 and 44 are provided with recesses 39 and 45, which receive locking pins 37 and 47. Sleeve 50 is slidable within the previously mentioned boss 24, but is secured against rotation relative thereto by a set screw 56, the inner end of which engages in an axially extending groove 58 cut into the side of sleeve 50. Sleeve 50 is externally threaded at its upper and lower ends to receive threaded adjusting nuts 60 and 62, which may be selectively backed off or advanced to effect a corresponding upward or downward adjustment of sleeve 50 and consequently of driving spindle 20 as a whole within boss 24. Axially extending openings 64 and 66 are formed in the bearing members 40 and 38 respectively, and form oil pockets therein, in communication with annular grooves 68 and 70, also formed in the bearing members. The lower end of bearing member 40 is slotted at 72 and a corresponding slot 74 is formed at the upper end of bearing member 38, to afford communication between the pockets 64 and 66. Oil may be introduced through a lateral passage 76, which may communicate with a suitable source of lubricant, such as one of the oil cups 78 shown in Figure 1. Oil thus introduced flows around the annular groove 68 formed in bearing member 40 and collects in pockets 64, from which it drains through the slots 72 and 74 into and collects in pocket 66. The lower end of core 28 is provided with a base plate 82, secured thereto by countersunk studs 84, and a suitable packing gland such as 86 is interposed between base plate 82 and the lower and downwardy extending end 80 of sleeve 50, to prevent the escape of lubricant between these members. A conventional tapered center 88 is received in a correspondingly tapered passage 90 formed in core 28, which is also provided with a passage 92 through which a suitable tool may be inserted to drive center 88 out of passage 90 when desired. The lower end 94 of core 28 extends part way into the central opening formed in base plate 82, and on its bottom face is provided with a radially extending key 96, which enters a keyway 98 formed in the chuck 100, to form a driving connection therebetween, as described in more detail below.

The lower spindle, designated generally as 22, comprises a conventional dead center 102, the center point of which cooperates with the worm assembly, as described in more detail below, and the other and tapered shank 104 of which is received in a correspondingly tapered bore formed in an adjusting sleeve 106. A deflecting apron 105 is preferably carried by center 102 to protect the adjusting structure thereof. Adjusting sleeve 106 is slidably mounted in a bushing 108 fitted into a lower boss 110, which extends forwardly from the machine frame 26, in axial alignment with the upper boss 24. Sleeve 106 is provided with rack teeth 112 on its surface with which a pinion 114 meshes. Pinion 114 is suitably secured to an adjusting shaft 116 to provide an upward and downward adjustment of the lower spindle 22 with reference to the upper spindle 20. As also shown in Figure 1, shaft 116 is suitably journaled in boss 110 and at its outer end is provided with hand wheels 118 which may be manually operated to turn pinion 114, and cause the driving spindle 22 to correspondingly move upwardly and downwardly within boss 110. Any suitable and conventional means (not shown) may be utilized to lock shaft 116 in each selected position of adjustment.

As previously stated, an important feature of the present invention is an improved arrangement for supporting a worm gear, the pitch circle of which is eccentric to the intended axis of rotation of the gear, so that the pitch circle is concentric with the driving spindle. In the illustrated arrangement, and in accordance with conventional practice, worm gear 10 is provided with an axial bore 120 which extends entirely therethrough, and into which a short shaft 122 is splined to provide a driving relation therebetween. The opposite ends of shaft 122 are keyed by keys 124 and 126 within the previously mentioned chuck 100 and a corresponding lower chuck 128 respectively. The upper end of shaft 122 is provided with a tapered recess 130, which receives the pointed end of center 88, and is eccentric to the axis of shaft 122 to a degree corresponding to the eccentricity of the pitch circle of worm 10. The splined relation between worm gear 10 and shaft 122 is such that these members when fitted together occupy a relative rotative position, which renders center 88 concentric with the pitch circle of worm gear 10. Similarly, the recess 132 formed in the lower face of the lower chuck 128 is in axial alignment with center 88, and is eccentric with reference to the axis of shaft 122, to the same extent, and is thus in axial alignment with centers 88 and 102 and concentric with the pitch circle of the gear 10. The upper surface of chuck 128 and the lower surface of collar 100 are provided with tapered recesses 134 and 136 respectively, which receive the correspondingly tapered ends of worm gear 10. The last mentioned tapered ends of worm 10 may be expected to be concentric with the bore of worm 10, i. e. eccentric to the pitch circle thereof, so that recesses 134 and 136 are correspondingly eccentric to the axes of centers 88 and 102.

Considering now the supporting structure for the lapping or other finishing tools 12, and referring particularly to Figures 1 through 6, each tool 12 is keyed by a key 142 on the outer end of a shaft 144, and is removably fixed in place axially thereof between a lock nut 146 and a collar 148, which bears against a face plate 150. Plate 150 is secured to shaft 144 by studs 152 and is provided with a protective flange 151, which cooperates with a tubular member 153, urged outwardly by spring 155, in preventing the cutting compound or other foreign matter from entering the bearing. Shaft 144 may be supported for rotation in a boss 154, through an assembly corresponding to that described with reference to spindle 20, and including the bearing members 156, 158 and 160. Each boss 154 in either suitably secured to or integrally formed with an associated slide 162, the rear face of which as viewed in Figure 1 is provided with a dovetail 164 which rides in a correspondingly formed way 166 formed in the frame portion 26. Preferably and as illustrated, a tapered gib 168 is provided to take up any wear between the dovetail 164 and the way 166. Gib 168 is interposed directly between the upper edge of the dovetail 164 and frame portion 26, as best seen in Figures 1 and 4, and is secured in place by an adjusting screw 170 provided with lock nuts 172 and 174, by which the gib may be withdrawn or advanced into the frame member to thereby restrict or enlarge the space provided for dovetail 164.

The rear end of each boss 154, as best seen in Figures 2 and 3, acts as a support for a conventional fluid brake mechanism 176, secured thereto by studs 178 which pass through cooperating flanges 180 and 182 formed on the brake housing and boss 154 respectively. Each brake shaft 177 is splined to the associated shaft 144. The constuction of the brake mechanism forms no part of the present invention and has not been illustrated in detail, it being understood that each braking mechanism is independently adjustable to impose any desired braking torque upon the shaft 144 associated therewith and consequently the particular tool 12 associated therewith. Meters such as 184 are conventionally provided to indicate the braking load thus imposed.

In further accordance with the present invention, the lapping tool carrying slides 162 are simultaneously adjustable toward and away from each other to correspondingly advance the tools into working relationship and out of working relationship with the worm gear 10. Referring particularly to Figures 1, 5 and 6, a push rod 190 is secured to the right hand slide 162 as viewed in Figure 1 within a boss 192 formed integrally with the latter, and a similar push rod 194 is correspondingly secured to the left hand slide 162 within boss 195. The inner ends of push rods 190 and 194 are formed with rack teeth 196 and 198 respectively, and are guided in slots 200 and 202 respectively formed in a bracket 204 which is suitably secured to the main machine frame portion 26. An adjusting shaft 206 is suitably journaled in the bracket 204 and in the main machine frame 26, and carries at its inner end a pin 208, which meshes with the previously mentioned racks 196 and 198. At its outer end, the shaft 206 is provided with the manual control member 210, formed as a bell crank for convenience of operation.

As is evident from inspection of Figure 6, rotation of bell crank 210 in a clockwise direction, causes push rod 190 to move to the right and push rod 194 to move to the left, thus separating the slides 162 and moving the lapping tools 12 out of mating relation with the worm gear 10. Rotation of bell crank 210 in a counter-clockwise direction effects a reverse operation, bringing slides 162 and consequently lapping tools 12 together. An automatic limit to the degree of inward movement of the lapping tools 12 with reference to the worm gears 10 is provided by a locking plate 212 and a cooperating dog 214. Locking plate 212 is secured in fixed relation to bracket 204 by studs 216 and dog 214 is pivotally supported on bellcrank 210 by trunnion 218. A tension spring 220 connected between the end of dog 214 and a pin 222 secured to and movable with bell crank 210 urges dog 214 to the position shown in Figure 6. The nose 224 of dog 214 is adapted to be received in a corresponding notch 226 cut in the periphery of plate 212. The right hand face of notch 226, as viewed in Figure 6, and the corresponding face of dog 224 are so angled as to meet in positive locking relation, to impose a positive limit to a counter-clockwise rotation of bell crank 210, and to impose a corresponding limit to inward movement of the lapping tools 12 with reference to gears 10. The opposite or left hand faces of notch 226 and nose 224, however, as viewed in Figure 6, are less abruptly angled, and permit clockwise rotation of bell crank 210, such rotation camming dog 214 out of notch 226 against the force of spring 220, and causing it to thereafter ride along the periphery of locking plate 212. It will be noted, accordingly, that the means including spring 220 and dog 214 acts to yieldingly oppose a separating movement of the tools. A limit to such clockwise rotation is provided by a pin 228 projecting from bell crank 210 and adapted to engage a shoulder 230 formed in the locking plate 212.

Considering the operation of the above described embodiment as a whole, it will be understood that in setting up the machine for operation, bell crank 210 is rotated in a clockwise direction from the operating position shown in Figure 6, to retract lapping tools 12 to positions in which they will not interfere with the removal or insertion of a worm gear 10 between spindles 20 and 22. Upon lowering the lower driving spindle 22 by means of the hand wheel 118, a worm gear and cooperating parts including the shaft 122 and chucks 100 and 128, with which the gear may previously have been assembled, may be moved into engagement with the driving spindle 28, key 96 in the latter entering the keyway 98 formed in chuck 100 to effect a driving connection therebetween. Thereafter, the lower spindle 22 may be moved upwardly, bringing the dead center 102 into cooperative engagement with the lower collar 128.

In the lapping or otherwise finishing of globoidal worms, it is essential that the axis of the lapping or other finishing tools accurately coincide with the axial center of the worm gear, and this adjustment, in accordance with the present construction, may readily be effected by the adjusting nuts 60 and 62 associated with the previously described sleeve 50, and which may be advanced or backed off to raise or lower sleeve 50 and consequently the driving spindles 20 with reference to the tools 12.

Upon completing the above initial adjustments and the chucking of gear 10 between spindles 20 and 22, the bell crank 210 may be rotated in a counter-clockwise direction, which action moves slides 162 and consequently lapping tools 12 toward each other, until the nose 224 of dog 214 drops into the notch 226 formed in the locking plate 212. This latter action interrupts the counter-clockwise rotation of bell crank 210 and determines the operating position of the lapping tools 12 with reference to the worm gear 10. This final operating position is preferably accurately adjustable and for this purpose in the illustrated construction, the push rods 190 and 194 are adjustable longitudinally of the associated slides 162 by the lock nuts 232 and 234, which may be backed off or advanced, to correspondingly move the push rods with respect to the bosses 192 and 195. The adjustment thus effected is preferably such that in the operating position, the crowns of the tool teeth are spaced slightly from the roots of the worm gear teeth, a corresponding spacing existing of course between the crowns of the worm gear teeth and the roots of the tool teeth.

Upon starting driving spindle 22 in rotation, which may be effected in the present instance by motor 236, which drives the previously mentioned pulley 30 through belt 238, worm gear 10 runs in mesh and correspondingly rotates the two lapping tools 12, each of which as previously described are subjected to a braking load of selectively and independently adjustable magnitude through the fluid brakes 176. For lapping operations, it is preferred to use tools, the teeth of which are of insufficient width to have full mating contact with the teeth of the worm gear 10, so that during rotation of worm gear 10 in one direction, only one tooth face is lapped. To effect the lapping of the opposite tooth faces, the direction of rotation of the worm 10 may be reversed or alternatively, the worm may be removed from the machine, and inverted, as will be understood.

In the alternative construction, shown in Figure 7, the general arrangement is as described with reference to the preceding figures. The worm element is supported on centers carried in bosses 24' and 110', which in turn are carried upon the portion 26' of the base 16'. The lapping tools 12' are supported on slides 162' which are controlled by a bell crank 210. As modified, however, the driving motor 236' is connected through belt 238' to drive one of the tools 12' through a pulley 240 which may be mounted on the shaft of the latter. With this arrangement, the braking mechanism associated with the driven tool 12' is eliminated, and the direct driving connection between the driving motor and the worm gear 10 is also eliminated. The other tool 12' is preferably braked as described with reference to the preceding figures. With this arrangement, the externally driven tool 12' laps one worm tooth face, and the other lapping tool 12' laps the other tooth face, thus permitting the lapping of both tooth faces in a single lapping operation.

Although specific embodiments of the present invention have been shown and described, it will be understood that various modifications in the form, number and arrangement of parts may be made therein within the spirit and scope of the present invention.

What is claimed is:

1. In a machine for finishing worm elements of the type in which the pitch circle is eccentric to the axis of a passage through the worm, means for supporting said worm for rotation about the axis of the pitch circle comprising a shaft passed through said worm passage in axial coincidence therewith and splined thereto; a collar fitted over said shaft and engaging said worm; means comprising a key for non-rotatively connecting said collar to said shaft; and means for rotating said collar about an axis coincident with the center of said pitch circle.

2. In a gear finishing machine means for supporting a gear for rotation; a pair of finishing tools; means including a slide individual to each finishing tool for supporting the same; and means for simultaneously actuating said slides to move said tools toward and away from said gear comprising a pivotally mounted arm; a stationarily supported cam plate; means including a dog carried by said arm and cooperating with said cam plate to yieldingly oppose rotation of said arm in a direction to withdraw said tools from said gear and to impose a positive limit to movement of said arm in a direction to cause said tools to approach said gear.

3. In a machine for finishing worm elements of the type in which the pitch circle is eccentric to the axis of a passage through the worm element, means for supporting said worm element for rotation about the axis of the pitch circle comprising a shaft passed through said worm passage in axial coincidence with said passage and drivingly connected to said worm element, a collar removably fitted over said shaft and engaging said worm, a driving connection between said collar and said shaft, and means for rotating said collar about an axis coincident with the center of said pitch circle.

JOSEPH C. DRADER.
JAMES MARTIN.